United States Patent [19]
Wylie

[11] Patent Number: 5,132,486
[45] Date of Patent: Jul. 21, 1992

[54] ADSORPTION-DESORPTION SEPARATION PROCESS FOR THE SEPARATION OF LOW AND HIGH OCTANE COMPONENTS IN VIRGIN NAPHTHAS

[75] Inventor: Rogwe Wylie, Baytown, Tex.

[73] Assignee: Wylie Engineering & Construction, Inc., Baytown, Tex.

[21] Appl. No.: 594,017

[22] Filed: Oct. 9, 1990

[51] Int. Cl.⁵ ............................................. C07C 7/12
[52] U.S. Cl. ................................... 585/826; 585/820; 585/822; 585/825; 208/310 R; 208/310 Z
[58] Field of Search .............. 208/310 R, 310 Z; 585/822, 826

[56] References Cited

U.S. PATENT DOCUMENTS

| | | | |
|---|---|---|---|
| 2,818,455 | 12/1957 | Ballard et al. | 208/310 R |
| 2,981,679 | 4/1961 | Herrmann | 208/310 R |
| 3,321,396 | 5/1967 | Dryer | 208/310 Z |
| 3,342,726 | 9/1967 | Moroll et al. | 208/310 Z |
| 3,539,501 | 11/1970 | Stokeld, Jr. | 208/310 Z |
| 3,539,502 | 11/1970 | Griswold | 208/310 R |
| 3,723,292 | 3/1973 | Glessner et al. | 208/310 R |
| 3,753,895 | 8/1973 | Francis | 208/310 R |
| 3,753,896 | 8/1973 | Bryan et al. | 208/310 Z |
| 3,770,621 | 11/1973 | Collins et al. | 208/310 R |
| 3,821,104 | 6/1974 | Hughes | 208/310 R |
| 3,922,218 | 11/1975 | Wanless | 208/310 R |
| 4,309,281 | 1/1982 | Dessau | 208/310 Z |
| 4,350,583 | 9/1982 | Fuder | 208/310 Z |
| 4,354,929 | 10/1982 | Wessels et al. | 208/310 Z |
| 4,367,364 | 1/1983 | Kulprathipanja et al. | 208/310 R |
| 4,374,022 | 2/1983 | Fuderer | 208/310 Z |
| 4,517,402 | 5/1985 | Dessau | 208/310 Z |
| 4,595,490 | 6/1986 | Gray, Jr. et al. | 208/310 Z |
| 4,717,784 | 6/1988 | Stem et al. | 585/738 |
| 4,956,521 | 9/1990 | Volles | 585/825 |

*Primary Examiner*—Helane Myers
*Attorney, Agent, or Firm*—Neal J. Mosely

[57] ABSTRACT

An improved adsorption-desorption process is disclosed for separating low octane components from field natural gasoline and virgin naphthas. The low octane materials may be further separated into chemical feed stocks, fluid catalytic cracking feed stocks, steam active reforming feed stocks, paraffinic solvents, and diesel and jet fuel blend stocks by conventional fractionation and/or solvent extraction processes. The remaining higher octane materials make excellent reformer feed and/or gasoline blend stocks.

17 Claims, 3 Drawing Sheets

ADSORPTION-DESORPTION SEPARATION PROCESS FOR THE SEPARATION OF LOW AND HIGH OCTANE COMPONENTS IN VIRGIN NAPHTHAS

BACKGROUND OF THE INVENTION

1. Field of the Invention

This invention relates to new and useful improvements in the processing of petroleum feed stocks and more particularly to a process for separation of fractions for different processes by absorption and desorption.

2. Brief Description of the Prior Art

It is well known that gasoline is composed of many different hydrocarbons having similar as well as quite different boiling points. It is also well known that different families or types of hydrocarbon molecules can have approximately the same boiling points, yet have significantly different octane numbers. The compounds having higher octane numbers perform better in high performance gasoline engines. Also in manufacturing gasoline, it is important that the blend of all the compounds in the gasoline blend have an effective octane which is sufficient for gasoline engines in which it will be used. Premium gasolines have higher octane numbers than do regular gasolines, and the premium gasoline may be used in higher performance engines.

Costs associated with present refinery processes for increasing the octane of motor gasolines result in premium grades costing significantly more than regular gasoline, even though their octane is only slightly higher than the regular grades. The phase-out of leaded gasoline for environmental reasons has contributed significantly to the costs of higher octane fuels. The future prospect of decreasing the amount of butanes in motor gasoline will further increase the costs of manufacturing higher octane gasolines. Limiting the aromatic content of motor gasoline because of air quality problems with high aromatic content fuels could limit the amount of premium gasoline available.

It is well known that light paraffinic hydrocarbons have higher octane numbers than heavier paraffinic hydrocarbons. Isoparaffins of the same molecular weight have higher octane numbers than normal paraffins. Likewise, highly branched paraffinic hydrocarbons have still higher octane numbers than isoparaffins of the same molecular weight.

Two current octane improvement processes based on these physical characteristics of hydrocarbons are namely: alkylation and normal pentane and normal hexane isomerization.

Alkylation, although it is the backbone for making high octane aviation gasoline, is expensive for motor gasoline grades. This process takes ethylene, propylene, butylene and pentylene compounds and reacts these materials with isobutane to form highly branched, high octane compounds. Slightly less than one and one-half barrels of feed are required to make one barrel of product. These compounds can be used in both aviation and motor gasolines.

Normal hexane and/or normal pentane are removed from a narrow cut hydrocarbon fraction by adsorption. These materials are isomerized to their respective isoparaffin. Any unisomerized normal paraffins may be recycled back through the adsorption cycle until all the normal compounds are converted to their respective isoparaffins. The isopentane produced has an octane number slightly higher than regular gasoline. The isohexanes produced have octane numbers almost 50 octane numbers above normal hexane, but still significantly lower than the octane of regular gasoline. High octane materials must be added to gasoline blend to make these isohexanes acceptable in motor gasoline.

All normal and iso- paraffins with molecular weight higher than normal hexane have such low octane numbers that they are more valuable as chemical and fluid catalytic cracking feed stock than as motor gasoline fractions. This severely limits the use of adsorption/isomerization because of the small amounts of normal pentane and normal hexane available for feed.

The most widely used process for upgrading virgin naphthas (55-70 octane) to motor gasoline is reforming. This process converts the naphthenes in virgin naphtha to higher octane aromatics. A slight loss of weight and significant loss in volume of gasoline occurs in this process. In spite of these losses, reforming is the best process now available for upgrading low octane naphtha.

Examples of two of the many possible naphthenes-to-aromatic reactions which occur in reforming are cyclohexane to benzene and isopropylcyclohexane to isopropylbenzene. Cyclohexane has octane numbers $M+R/2=80.1$ and the corresponding isopropylcyclohexane octane number is 62.0. The aromatics produced from both of these compounds exceed 100 octane. A portion of the isoparaffin and normal paraffins is converted to aromatics during the removal of hydrogen from the naphthenes. One of the more attractive aromatization reactions is the conversion of normal heptane (zero octane) to toluene (109 octane). The volume of gasoline loss per octane number gain for the stoichiometric conversion of cyclohexane, isopropylbenzene and normal heptane are: 0.56%/ON, 0.26%/ON, and 0.27%/ON respectively.

Some 20 to 30 percent of virgin naphthas are naphthenes. The octane numbers of these naphthas can be increased part of the way toward motor gasoline quality by the relatively efficient dehydrogenation step. In order to increase the octane numbers of the virgin naphthas to motor gasoline quality, the heavier normal paraffins and isoparaffins must be cracked to lighter, higher octane compounds or converted to aromatic compounds as a side reaction. A significant volume loss of gasoline blend stocks occurs in these cracking and/or aromatization steps. Unfortunately high octane branch paraffins are also cracked with a loss of high octane materials with little gain in octane.

Yields of motor gasoline equivalent octane raffinate stream from reformed naphthas are typically in the 80-85 volume percent. Frequently some of the high octane aromatics are extracted from the reformate for sales as more valuable chemical feed stocks. Reformate octane numbers may be increased above motor gasoline quality in order to offset this removal of aromatics and to blend lower octane materials into the motor gasoline pool. Frequently reformer operations are adjusted to produce reformate streams with octanes 5 to 10 octane numbers higher than motor gasoline. Under these severe conditions reformate yields of only 75 to 80 volume percent are realized.

The removal of normal paraffins from reformer feed by adsorption on molecular sieves for chemical feed stocks has been suggested in the literature. The quality of reformer feed would be improved and potentially valuable chemical feed stocks are produced. Yields of ethylene from cracking normal paraffins are reported to be 20-30 percent greater than from straight naphthas. The amount of total normal paraffins in reformer feed is usually only 5-15%. Unless the extracted normal paraffins are needed as a feed stock to a particular process, the costs of processing large quantities of feed for such low yields have been prohibitive.

The amounts of isoparaffins in reformer feed are some three to four times greater than amounts of normal paraffins. Although their octane numbers are slightly higher than their respective normal compound only isopentane and possibly isohexane are desirable components of motor gasoline.

As noted above, the use of adsorption/desorption processes is well known in petroleum processing and refining, especially for the separation of close boiling fractions which are otherwise difficult to separate. A number of U.S. patents are illustrative of the state of the art of adsorptive/desorptive separation.

Wylie U. S. Pat. No. 4,381,419 discloses an adsorption/desorption reparation process with integrated light and heavy desorbents.

Evans U.S. Pat. No. 4,804,802 discloses an isomerization process with adsorption/desorption separation.

Harandi U.S. Pat. No. 4,835,329 discloses the use of zeolite based catalysts in alkylation processes and absorptive separation.

Findley U.S. Pat. No. 4,874,524 discloses the separation of adsorbed components by variable temperature desorption.

Sircar U.S. Pat. No. 4,705,541 discloses production of mixed gases of controlled composition by pressure swing adsorption.

Pirkle U.S. Pat. No. 4,655,796 discloses continuous sorption process with simulated countercurrent flow.

Antrim U.S. Pat. No. 4,610,965 discloses adsorption-desorption purification of glucose isomerase; treatment with salt solutions.

Juntgen U.S. Pat. No. 4,432,774 discloses adsorption-desorption process for the recovery of hydrogen; pressurization-depressurization cycles.

Miwa U.S. Pat. No. 4,070,164 discloses adsorption-desorption pressure swing gas separation.

Geissler U.S. Pat. No. 4,029,717 discloses a simulated moving bed absorption-desorption process for paraxylene recovery.

Woodle U.S. Pat. No. 3,810,950 discloses a process for converting reactant into product including adsorption-desorption cycle for recycle of unreacted reactant.

Woodle U.S. Pat. No. 3,767,563 discloses an adsorption-desorption process for removing an unwanted component from a reaction charge mixture.

Reighter U.S. Pat. No. 3,675,392 discloses an adsorption-desorption method for purifying $SF_6$.

SUMMARY OF THE INVENTION

One of the objects of this invention is to provide an improved adsorption-desorption process for separation of close boiling hydrocarbons.

Another object of the invention is to provide an improved adsorption-desorption process for separating low octane components from field natural gasoline and virgin naphthas.

Another object of the invention is to provide an improved adsorption-desorption process for separating low octane components from field natural gasoline and virgin naphthas wherein the low octane materials may be further separated into chemical feed stocks, fluid catalytic cracking feed stocks, paraffinic solvents, and diesel and jet fuel blend stocks by conventional fractionation and/or solvent extraction processes, etc.

Another object of the invention is to provide an improved adsorption-desorption process for separating low octane components from field natural gasoline and virgin naphthas wherein the low octane materials may be further separated into chemical feed stocks, fluid catalytic cracking feed stocks, paraffinic solvents, and diesel and jet fuel blend stocks by conventional fractionation and/or solvent extraction processes and the remaining higher octane materials are used as reformer feed and/or gasoline blend stocks.

Other objects of the invention will become apparent from time to time throughout the specification and claims as hereinafter related.

DESCRIPTION OF THE PREFERRED EMBODIMENTS

An improved process removes all the low octane normal and isoparaffins from naphthas and field natural gasolines. An ideal process would extract all normal hexane and heavier normal paraffins and all isoheptanes (methyl hexanes) and heavier isoparaffin compounds. The process of this invention is flexible enough so that the isoparaffins and normal paraffins are removed as a separate extract streams or together as a single extract stream. The highly branched paraffins, the naphthenes, and aromatics are unextracted, except for benzene and n-paraffin substituted aromatics.

The higher molecular weight normal and isoparaffins compounds in the extract streams have high cetane numbers and make premium blend stocks for diesel and jet fuels. Materials which can not be used in these premium fuels are used as steam cracker, steam active reforming feed stocks and fluid catalytic cracking feed stocks. The raffinate stream, which contains highly branched paraffins, naphthenes and aromatics makes excellent reformer feed. Naphthenes can be converted to aromatics at mild conditions, so very little of the high octane paraffinic materials is destroyed. Reformate yields of over 90 volume percent are realized with reformate octane numbers significantly above 100.

Use of some of the low octane paraffins as fluid catalytic cracking feed is particularly attractive since ethers can be made from the light olefins produced. Ethers are particularly important because of their high octane characteristics and their beneficial effect on engine emissions. The inclusion of ethers in motor gasoline may be mandated now or in the future.

The large number of naphthas and natural gasolines available and the wide product slates for various refineries make it impractical to describe all the potential uses for the described adsorption process. The few uses described below are only examples and not intended to be all inclusive for the many possible combinations for refinery processes and the new adsorption process. One skilled in refinery processes could easily show other advantages of the new adsorption process in many additional ways.

The material balances are based on a partially debenzenized feed. EPA is beginning to restrict benzene in motor gasoline so the debenzenizing operation would remove most of the benzene percursors from reformer feed. The adsorption process will remove benzene. If the benzene content of motor gasoline is restricted enough, refineries without extraction facilities may want to reroute some refining streams to the adsorption unit just to remove benzene.

The relative adsorption of the various compounds varies markedly with solution compositions as well as the compounds adsorbed on the adsorbent. In a countercurrent adsorption unit, the more easily adsorbed materials are adsorbed by the lower beds. The recovery of the least adsorbed materials takes place on freshly regenerated adsorbent, and the liquid phase is essentially free of the more easily adsorbed materials.

Table 1 shows the relative adsorption of various hydrocarbons on Linde's S-115 silicate based adsorbent. Linde S-115 silacalite (described in U.S. Pat. No. 4,061,724 is a novel crystalline silica composition having uniform pore dimensions of approximately 5.4 Angstrom units prepared by calcining a crystalline hydrated alkylonium silicate prepared hydrothermally from a reaction mixture containing as essential reagents, water, amorphous silica and a quaternary ammonium compound at a pH of at least 10. The crystalline silica, because of its uniform pore structure, is capable of making size selective separations of molecular species, but neither it nor its silicate precursor exhibit ion-exchange properties. This absorbent has a very useful hydrophobic/organophilic characteristic which permits its use in selectively adsorbing organic materials from water, either in liquid or vapor phase. It is a silica polymorph consisting of crystalline silica, which after calcination in air at 600° C. for 1 hour, has a mean refractive index of 1.39 and a specific gravity at 25° C. OF 1.70 g./cc.

It is impractical to show the adsorption of all compounds which are present in virgin naphthas. The type of binders also affect the relative adsorption of these compounds on the adsorbent. These effects are also included in Table 1. Both mono methyl and normal compounds are adsorbed by S-115. Normal compounds of the same molecular weight are more strongly adsorbed than the isoparaffins. Adsorption of both normal and iso paraffins increases with molecular weight. Adsorption of benzene, toluene, ethyl benzene, and para xylene are about the same. Ortho xylene was used to show the non-absorption of non-para type aromatics. Other tests with methyl cyclohexane show that cycloparaffins are not absorbed.

TABLE I

ADSORPTION OF HYDROCARBONS WITH S-115 AND S-115 WITH VARIOUS BINDERS

| COMPOUND | S-115 | S-115 With 20% SiO$_2$ Binder | S-115 With 20% Al$_2$O$_3$ Binder |
|---|---|---|---|
| 2 Methyl Heptane | 12.3 | 5.6 | 0.8 |
| 3 Methyl Octane | 39.5 | 15.1 | 3.1 |
| 2 Methyl Nonane | 139.7 | 66.0 | 9.2 |
| Normal Octane | 32.3 | 19.4 | 2.5 |
| Normal Nonane | 88.6 | 213.6 | 128.7 |
| Normal Decane | 659.4 | 1598.6 | 411.6 |
| Toluene | 1.0 | 1.0 | 1.0 |
| Ortho Xylene | 0.17 | 0.05 | 0.03 |
| 2,2,4 Trimethyl-pentane | 0.05 | 0.01 | 0.01 |

The effects on the adsorption of normal compounds by the addition of 5A molecular sieves to S-115 is shown in Table 2. Small amounts of 5A will significantly increase the adsorption of the heaviest normal paraffin. As the concentration of the 5A sieves is increased, successively lower molecular weight normal paraffins will be adsorbed.

TABLE 2

ADSORPTION OF HYDROCARBONS WITH MIXTURES OF S-115 AND 5A MOLECULAR SIEVES

| | Relative Adsorption of Compounds to Toluene for S-115 - 5A Mixtures | | |
|---|---|---|---|
| COMPOUND | 100% S-115 with SiO$_2$ binder | 75% S-115/ 25% 5A | 50% S115/ 50% 5A |
| 2 Methyl Hexane | 2.5 | 1.8 | 1.5 |
| 2 Methyl Heptane | 4.2 | 3.6 | 2.0 |
| 3 Methyl Octane | 7.5 | 4.2 | 2.3 |
| 2 Methyl Nonane | — | — | — |
| Normal Heptane | 6.3 | 9.9 | 36.0 |
| Normal Octane | 9.8 | 24.5 | 3087 |
| Normal Nonane | 34.5 | 2186 | 3305 |
| Toluene | 1.0 | 1.0 | 1.0 |
| Ethylbenzene | 1.2 | 1.2 | 1.2 |
| Paraxylene | .95 | .92 | 1.0 |
| Ortho Xylene | 0.11 | 0.16 | 0.23 |
| Methyl Cyclohexane | 0.11 | 0.11 | 0.10 |
| 2,2,4 Trimethyl-pentane | 0.01 | 0.01 | 0.02 |

EXAMPLE 1

Figure 1:
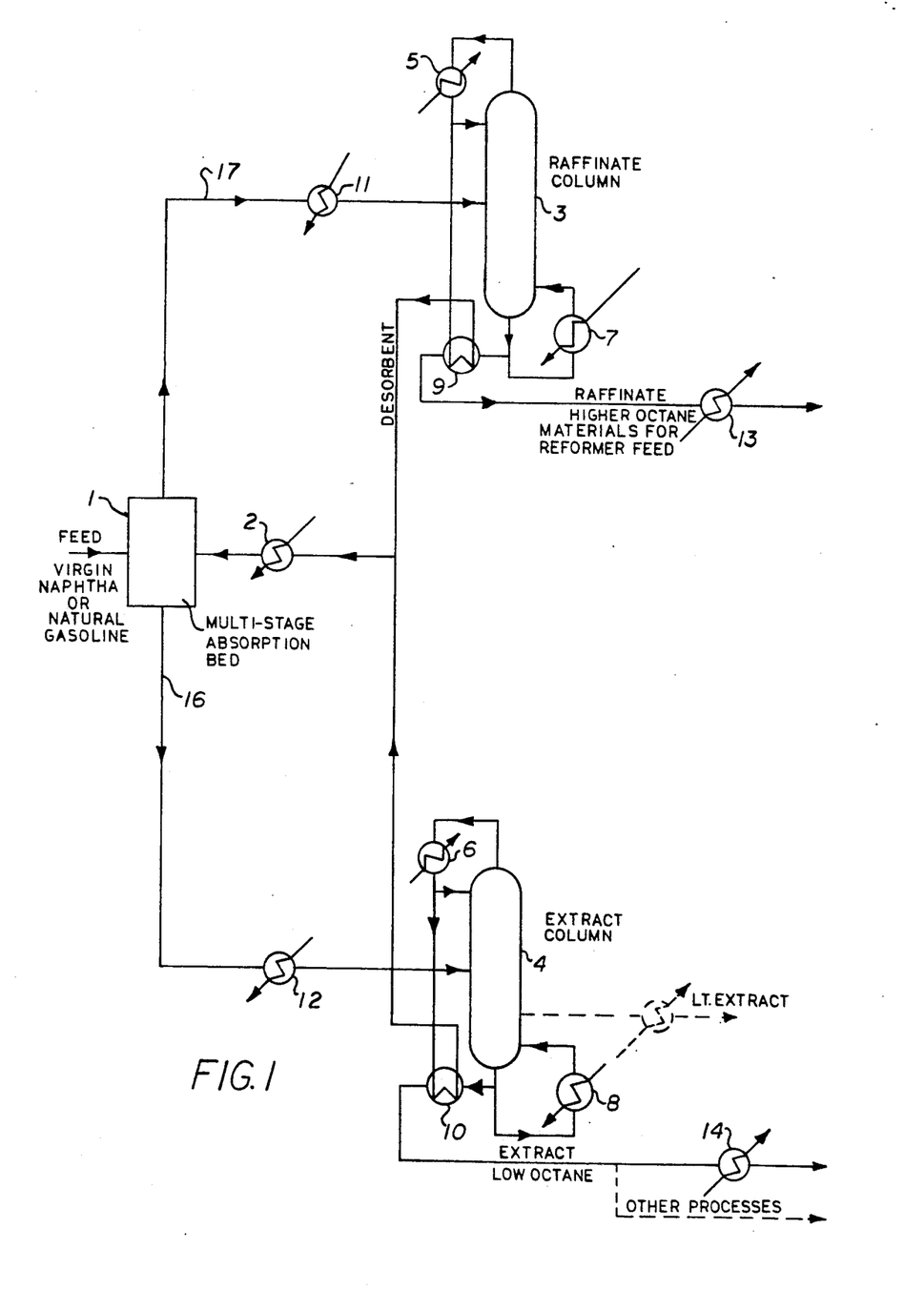
FIG. 1 is a process flow sketch for the described adsorption process separating a virgin naphtha into a low octane stream and a higher octane stream.

FIG. 1 is a process flow sketch for the described adsorption process separating a virgin naphtha into a low octane stream and a high octane stream. This process flow is for a simple unit which is used in refineries that do not produce significant amounts of aromatics for sale. Motor gasoline quality can still be obtained by these refineries while leaving significant quantities of the lighter normal and methyl paraffins in the gasoline. These refineries frequently debenzenize their reformer feeds. The overhead fraction may be isomerized economically to produce isopentane and methyl hexanes for inclusion in their motor gasoline pool.

The debenzenized naphtha stream is then fed to a reformer where the naphthenes are converted to aromatics and most of the heavier paraffinic materials are cracked to lower molecular weight hydrocarbons. The described process processes this reformer feed stream ahead of the reformer.

The feed is typically a virgin naphtha of about the following composition: di- and tri-methyl paraffins 10% vol.; isoparaffins 25% vol.; n-paraffins 13% vol.; naphthenes 37% vol.; and aromatics 15% vol. The feed is charged as a liquid to a multi-stage adsorption bed 1 such as, but not limited to, the multi-stage adsorption process used to recover paraxylene (U.S. Pat. No.

4,381,419). The feed temperature is between ambient and 400° F. but is normally between 150° F. and 250° F. Here the feed is contacted counter-currently with successive beds of previously regenerated adsorbent until the desired amounts of normal and mono-methyl paraffins have been adsorbed.

The higher octane di- and tri-methyl paraffins, branched chain substituted aromatics, and naphthenes are not be adsorbed and leave the adsorption beds as a raffinate stream. Adsorbent to feed ratios are adjusted so some of the lighter isoparaffin compounds would not be adsorbed. The amount of light isoparaffins not absorbed is determined by gasoline quality needed. Motor blend stocks with a higher octane number would permit more isoparaffins to be left in the raffinate while still meeting motor gasoline quality.

Using a column containing 10–50 countercurrent beds of adsorbent and a feed input of 100 volumes, the adsorbent retains 30 volumes and the raffinate stream consists of 70 volumes.

The saturated adsorbent bed then is contacted countercurrently with a small desorbent stream comprising n-paraffins having a chain length at least one carbon atoms different from the adsorbed materials to purge all unadsorbed feed from the void space between the beds. Some of the low octane materials are desorbed during this purging operation. This contaminated desorbent and feed flow (composition about 70% vol. of feed and 30% vol. desorbent) through the aforementioned beds and leave the adsorbent vessel with the raffinate stream. Any low octane materials carried with this desorbent is readsorbed along with the low octane materials adsorbed from the feed stream.

The purified adsorbent beds are further contacted countercurrently with a larger desorbent stream 15 to remove the adsorbed or extracted materials from the adsorbent. The desorbent and the extracted materials leave the adsorption section as an extract stream 16. The desorbed beds are returned to the adsorption section, again contacting the raffinate and feed stream countercurrently.

The aforementioned raffinate stream, consisting of the higher octane materials and desorbent, consisting of about 14% vol. di- and trimethyl paraffins, 11% vol. isoparaffins, normal paraffins substantially 0, 25–50% vol. desorbent, 53% vol. naphthenes and 22% vol. aromatics, is kept separate from the extract stream consisting of the low octane compounds (50–75% vol. desorbent, and extract consisting of 58% vol. isoparaffins and 42% vol. n-paraffins. The raffinate stream is preheated in heat exchanger 11 and charged to a fractionation tower 3 for separating the raffinate and desorbent.

The fractionation sequence shown is for the desorbent being lighter than the raffinate. With a light desorption process a hydrocarbon at least one carbon number lower than the lightest material in the feed stream to be recovered in the extract is normally chosen. The light desorbent has a boiling point as low or lower than the lighter boiling compounds in the raffinate stream and goes overhead as a vapor stream from column 3.

The overhead vapors are condensed in heat exchanger 5. A portion of the condensed desorbent is recycled as reflux to raffinate column 3. The remainder is heated via heat exchanger with the raffinate bottoms stream in heat exchanger 9 and is then recycled to the adsorption section 1 as a portion of the desorbent needed for purifying the extract and regenerating the adsorbent.

The extract in admixture with desorbent used to remove the absorbed low octane materials from the adsorbent is kept separate from the above raffinate desorbent stream. This extract stream from the bottom of column 1 is preheated in heat exchanger 12 and charged to extract column 4. In the light desorbent process the desorbent is taken overhead as a vapor stream. The desorbent is condensed in heat exchanger 6. A portion of the condensed desorbent is returned to the extract column for reflux. The remainder is heated by heat exchange with the extract bottoms stream in heat exchanger 10. This heated desorbent stream is mixed with the desorbent stream from the raffinate column. These streams are further heated in heat exchanger 12 and the combined stream becomes the desorbent needed to purify and strip the extract from the adsorbent. In the light process the desorbent enters the adsorption section 1 at a temperature equal to or higher than that of the feed. The desorbent temperature is normally be 0° F. to 100° F. warmer than the feed.

A portion of the bottoms liquid stream from the extract column 4 is routed through reboiler 8 to form the vapors needed to fractionate the desorbent from the extract. The surplus liquid is partially cooled by heat exchange with desorbent in exchanger 10 and sent directly to other process units or further cooled in heat exchanger 14 and sent to tankage for jet and/or diesel fuels.

A typical material balance for this process for a debenzenized feed is shown in Table 3 below.

TABLE 3

| Components | Feed % v. | Octane | Extract % v. | Octane | Raffinate % v. | Octane |
|---|---|---|---|---|---|---|
| DM/TM Paraffins | 10.0 | | 0.0 | | 14.0 | |
| Isoparaffins | 25.0 | | 58.0 | | 11.0 | |
| N-Paraffins | 13.0 | | 42.0 | | 0.0 | |
| Naphthenes | 37.0 | | 0.0 | | 53.0 | |
| Aromatics | 15.0 | | 0.0 | | 22.0 | |
| Total | 100.00 | 51 | 100.00 | 3.0 | 100.00 | 73.0 |

The extract comprises 31% vol. and the raffinate 69% vol. based on the feed.

Since the extract stream is composed of several compounds ($C_7$–$C_{11}$ n-paraffins and $C_8$–$C_{11}$ monomethyl paraffins), it may be desirable to divide the stream into light boiling fractions and heavier boiling fractions by removing the light materials as a side stream from the extract column and a heavier extract stream from the bottom of the column. One skilled in fractionation could easily show other modifications to the fractionation sequence which would have advantages in separating the extract into usable streams. For simplicity, the octane numbers for the various streams in the material balance are linear blends of volume percents. The actual octane number for any stream could be quite different. One experienced in motor gasoline blending has sophisticated blending correlations which would predict the octane number of the stream close to their measured octane value.

This simpler adsorption process is also beneficial to chemical companies which crack virgin naphtha to produce ethylene and other petrochemical products. Their feed streams can be processed in the described adsorption process to produce an extract stream, which would have superior cracking qualities compared to their naphtha feed, and a high octane raffinate stream which can be sold to refineries for premium reformer feed stock.

The simpler process would also be useful to companies which sell virgin naphtha. Their virgin naphtha is split into optimum feed stocks for refineries and optimum feed stocks for chemical plants. Each stream demands a higher value than the virgin naphtha.

In refinery petrochemical complexes which produce both normal refinery fuel products and petrochemical products, a more sophisticated process is desirable.

EXAMPLE 2

Figure 2:
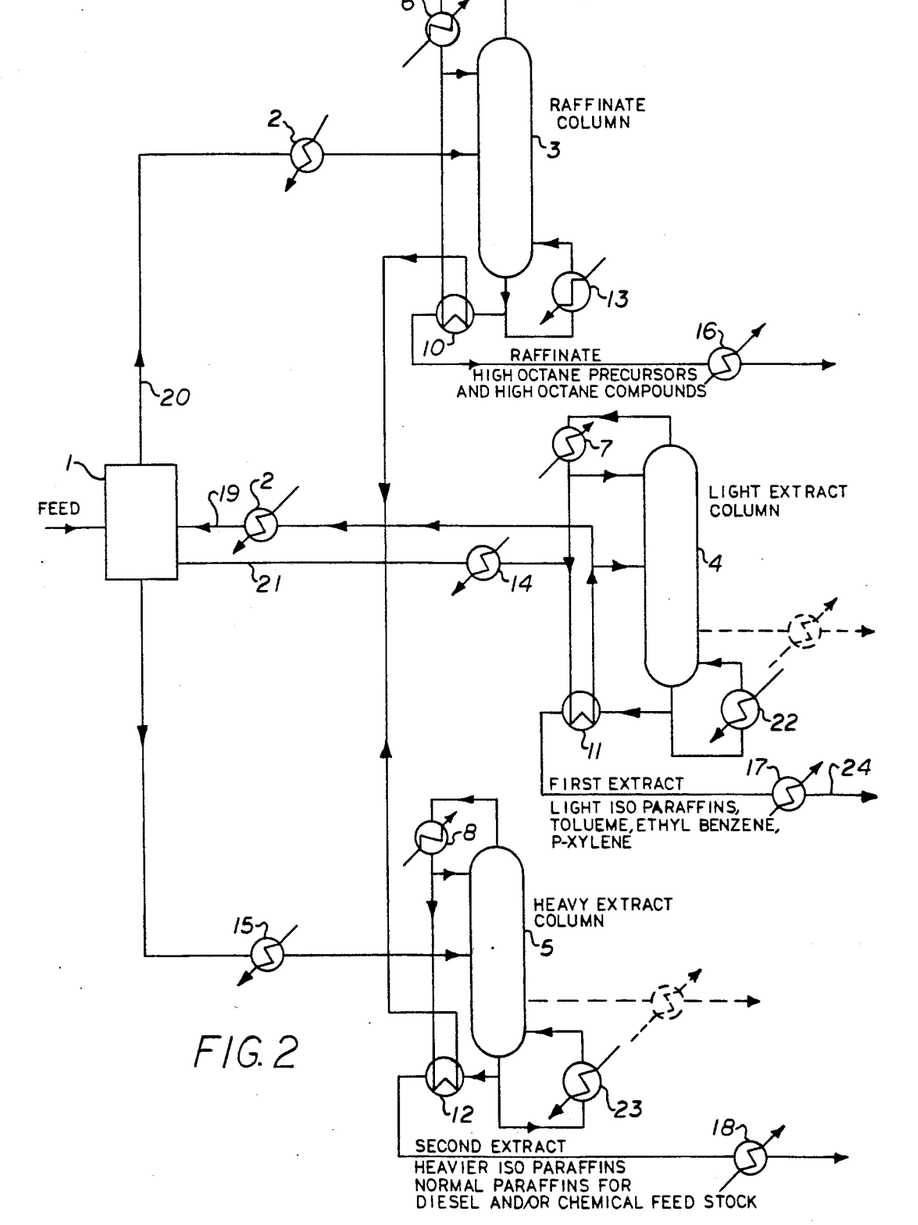
FIG. 2 shows an adsorption process which produces two lower octane extract streams in addition to a higher octane raffinate stream.

FIG. 2 shows a more sophisticated adsorption process which produces two lower octane extract streams in addition to the higher octane raffinate stream. The composition of these streams is controlled by the adsorption characteristics of the compounds rather than their boiling points.

As in the simpler process the naphtha feed (di- and trimethyl paraffins 10% vol.; isoparaffins 25% vol.; n-paraffins 13% vol.; naphthenes 37% vol.; and aromatics 15% vol.) is charged at the proper temperature to the adsorption section 1. A higher adsorbent to feed ratio is maintained, e.g., 8-15 lb. adsorbent per lb. feed, in order to adsorb the lower molecular weight isoparaffins and aromatic compounds with molecular diameters of about 5.9 A in addition to the more easily adsorbed compounds.

After adsorbing materials from the feed stream, the saturated adsorbent is purged with a small amount of desorbent (same composition as stream 21)to remove unadsorbed feed from the void areas of the adsorbent beds. This desorbent and the purged materials flows through the adsorption beds where the extractable materials are recovered from the purge stream.

The raffinate stream leaving the top of the adsorption section consists of di- and tri- methyl paraffins, naphthenes, aromatics with molecular diameters larger than 5.9 A, and any desorbent used in purging the void in the adsorbent beds. This raffinate stream is preheated in heat exchanger 2 and is then charged to raffinate column 3.

The flow shown is again for a light desorbent process. A similar flow sketch can be made for a heavy desorbent (dodecane or higher paraffins or similar boiling naphthenes or aromatics) process by one skilled in the art. Since in a light desorbent process the desorbent has a lower boiling point than the raffinate compounds, the desorbent leaves the raffinate column as an overhead vapor stream. The vapors are condensed in heat exchanger 6. A portion of the desorbent is returned as reflux to the raffinate column. The surplus desorbent is heated by heat exchange with the raffinate bottoms stream from the raffinate column. The desorbent is then returned to the adsorption section and used as a portion of the desorbent needed by the process. In a heavy desorbent process, the desorbent used is higher boiling than the absorbed hydrocarbons and the adsorbed materials are taken off overhead in the heavy extract column 5.

After the voids in the saturated adsorbent have been purged of undesirable compounds the beds are partially stripped countercurrently with a small amount of desorbent. The desorbent rate is controlled to remove only the lightly adsorbed compounds. The desorbent and lightly adsorbed materials are withdrawn from the adsorption section, preheated in heat exchanger 14 and charged to light extract column 4. The desorbent having a lower boiling point leaves the light extract column 4 as an overhead vapor stream. This stream is condensed in heat exchanger 7.

A portion of the adsorbent is returned to the column 4 for reflux. The surplus desorbent is heated by heat exchange with the light extract stream and then is returned to the adsorption section to supply a portion of the desorbent required for the process. The light extract leaves the bottom of the light extract column 4 as a liquid. A portion of this liquid is routed through and vaporized in reboiler 21 to supply the vapors needed for fractionation. The surplus light extract is removed as a product stream 24. It is cooled by heat exchange with the desorbent stream in heat exchanger 11. This stream can be routed directly to other process units or further cooled in heat exchanger 17 and sent to tankage.

Some refinery and chemical plants' product slates may make it desirable to remove a portion of the light extract as a separate stream. The light methyl paraffins, and controlled amounts of the light aromatics can be removed in a concentrated form in a side stream from the light extract column.

The bottoms stream from column 4 consists mainly of the heavier aromatic fractions. The concentration of ethylbenzene and paraxylene in the A fraction is roughly equal. Recovering these materials in this manner more than doubles their normal concentration in refinery xylene fractions. This permits much more economical recovery of these valuable petrochemicals by existing technologies and present the possibility of such recovery by smaller refineries where this has not been economically feasible.

One skilled in fractionation could easily show other modifications to the fractionation sequence which would have advantages in separating the light extract into usable streams.

The more heavily adsorbed materials are removed from the adsorbent with a stream of desorbent flowing countercurrently to the adsorbent. This stream is removed from the adsorption section and is charged to separate fractionation facilities. The admixture is preheated in heat exchanger 15 and is charged to the heavy extract column.

In the light desorbent process the desorbent leaves the heavy extract column 5 as an overhead vapor stream. This vapor is condensed, and a portion of the liquid desorbent is returned to the heavy extract column 5 as reflux. The surplus desorbent is heated in heat exchanger 12 by heat exchange with the heavy adsorbent stream and returned to the adsorption section of the process. Here this desorbent stream is mixed with desorbent streams from the raffinate column and light extract column, is preheated and charged to the adsorption bed for purifying and stripping the extract streams.

In the light adsorption process, the desorbent stream is normally charged to the adsorption column 1 slightly warmer than the feed stream. The desorbent normally has a temperature of 0° F. to 100° F. higher than the feed temperature but can be 100° F. to 300° F. higher than the feed. Both the light extract and heavy extract streams would consist of several compounds. In some cases it may be desirable to split either or both of these streams into light and heavy streams by removing a side stream from the appropriate fractionation tower.

One skilled in fractionation could easily show other modifications to the fractionation sequence which would have advantages in separating the heavier extract into usable streams. The split between the light and heavy extract can be adjusted to improve fractionation efficiencies in meeting changing product slates.

A typical material balance for this process for a debenzenized feed is shown in Table 4 below.

TABLE 4

| Components | Feed | | Light Extract | | Hvy. Extract | |
|---|---|---|---|---|---|---|
| | % v. | Octane | % v. | Octane | % v. | Octane |
| DM/TM Paraffins | 10.0 | | 0.0 | | 0.0 | |
| Isoparaffins | 25.0 | | 59.0 | | 59.0 | |
| N-Paraffins | 13.0 | | 1.0 | | 42.0 | |
| Naphthenes | 37.0 | | 0.0 | | 0.0 | |
| Aromatics | 15.0 | | 40.0 | | 0.0 | |
| Total | 100.00 | 51 | 100.00 | 70.0 | 100.00 | 3.0 |

| Components | Feed | | Raffinate | |
|---|---|---|---|---|
| | % v. | Octane | % v. | Octane |
| DM/TM Paraffins | 10.0 | | 18.0 | |
| Isoparaffins | 25.0 | | 0.0 | |
| N-Paraffins | 13.0 | | 0.0 | |
| Naphthenes | 37.0 | | 64.0 | |
| Aromatics | 15.0 | | 18.0 | |
| Total | 100.00 | 51 | 100.00 | 73.0 |

The light extract comprises 13% vol., the heavy extract 31% vol. and the raffinate 56% vol. based on the feed.

Mixtures of selected adsorbents, as shown in Tables 1 and 2, may be used to change the composition of the light and heavy extract stream. The addition of an adsorbent which will selectively adsorb normal paraffin compounds may be used to selectively transfer normal paraffin from the light extract stream to the heavy extract stream or heavy isoparaffins from its heavy to light extract. These adsorbents generally extract heavier normal paraffins over lower molecular weight normal paraffins. The ratio of adsorbents which adsorb only normal paraffins, to adsorbents which adsorb both isoparaffins and normal paraffins, may be used to preferentially control the normal paraffins concentrated in the bottom stream. The addition of small amounts of normal paraffins adsorbents will preferentially adsorb the heavier paraffins. Adding additional amounts of these adsorbents will successively adsorb lower molecular weight normal paraffins.

A typical material balance for this process for a debenzenized feed is shown in Table 5 below.

TABLE 5

| Components | Feed | | Isoparaffin Extract | | n-Paraffin Extract | |
|---|---|---|---|---|---|---|
| | % v. | Octane | % v. | Octane | % v. | Octane |
| DM/TM Paraffins | 10.0 | | 0.0 | | 0.0 | |
| Isoparaffins | 25.0 | | 81.0 | | 0.0 | |
| N-Paraffins | 13.0 | | 0.0 | | 100.0 | |
| Naphthenes | 37.0 | | 0.0 | | 0.0 | |
| Aromatics | 15.0 | | 19.0 | | 0.0 | |
| Total | 100.00 | 51 | 100.00 | 38.0 | 100.00 | −10.0 |

| Components | Feed | | Raffinate | |
|---|---|---|---|---|
| | % v. | Octane | % v. | Octane |
| DM/TM Paraffins | 10.0 | | 18.0 | |
| Isoparaffins | 25.0 | | 1.0 | |
| N-Paraffins | 13.0 | | 0.0 | |
| Naphthenes | 37.0 | | 65.0 | |
| Aromatics | 5.0 | | 16.0 | |
| Total | 100.00 | 51 | 100.00 | 72.0 |

The isoparaffin extract comprises 31% vol., the n-paraffin extract 13% vol. and the raffinate 56% vol. based on the feed.

EXAMPLE 3

Figure 3:
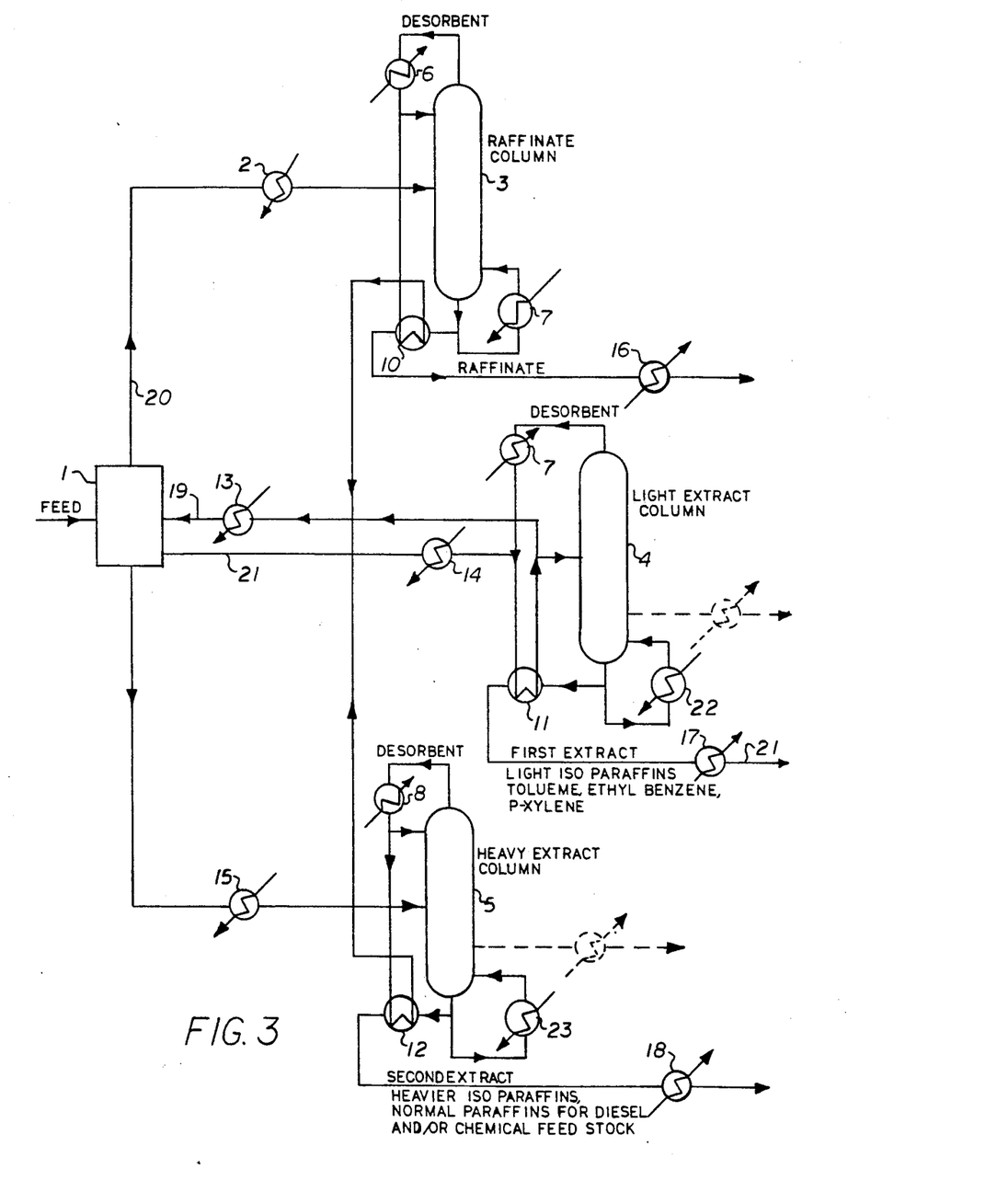
FIG. 3 shows another adsorption process which produces two lower octane extract streams with different compositions from FIG. 2 in addition to the higher octane raffinate stream.

FIG. 3 shows an adsorption process which produces two lower octane extract streams in addition to the higher octane raffinate stream. The composition of these streams is controlled by the adsorption characteristics of the compounds rather than their boiling points. Type 5A molecular sieves are added as a second adsorbent so that iso and normal paraffin can be recovered in separate streams.

The naphtha feed (di- and tri-methyl paraffins 10% vol.; isoparaffins 25% vol.; n-paraffins 13% vol.; naphthenes 37% vol.; and aromatics 15% vol.) is charged at the proper temperature, e.g., 150°–250° to the adsorption section 1 containing S-115 adsorbent with $SiO_2$ binder. Here sufficient adsorbent to feed ratios, e.g., 8–15/1 wt., are maintained to adsorb the lower molecular weight isoparaffins and aromatic compounds with molecular diameters of about 5.9 A. After adsorbing materials from the feed stream, the saturated adsorbent (containing about 10% wt. adsorbed extract) is purged with a small amount of desorbent (the same composition as stream 21) to remove unadsorbed feed from the void areas of the adsorbent beds. This desorbent and the purged materials flow through the adsorption beds in order to recover any extractable materials.

The raffinate stream 20 from the adsorption section consists of di- and tri- methyl paraffins, naphthenes, and aromatics with molecular diameters of larger than 5.9 A, and any desorbent used in purging the void in the adsorbent beds. This raffinate stream is preheated in heat exchanger 2 and would then be charged to raffinate column 3. The flow shown is again for a light desorbent process. A similar flow sketch can be made for a heavy desorbent process by one skilled in the art.

Since in a light desorbent process the desorbent (pentanes) has a lower boiling point than the raffinate compounds, the desorbent would leave the raffinate column as an overhead vapor stream. The vapors are condensed in heat exchanger 6. A portion of the desorbent is returned as reflux to the raffinate column. The surplus desorbent is heated by heat exchange with the raffinate bottoms stream from the raffinate column. The desorbent is then be returned to the adsorption section and used as a portion of the desorbent needed by the process.

After the saturated adsorbent has been purged of unadsorbable materials, the beds are partially stripped countercurrently with a moderate amount of desorbent. The desorbent rate is controlled to remove only the adsorbed aromatics, and the isoparaffins. The desorbent and these materials ($C_6$–$C_{11}$ n-paraffins, benzene, ethyl benzene, paraxylene, or propyl benzene) are withdrawn from the adsorption section, preheated in heat exchanger 14 and charged to light extract column 4. The desorbent having a lower boiling point leaves the light extract column as an overhead vapor stream. This stream is condensed in heat exchanger 7. A portion of the adsorbent is returned to the column for reflux.

The surplus desorbent is heated by heat exchange with the light extract stream in exchanger 11 and then is returned to the adsorption section to supply a portion of the desorbent required for the process. The light extract would leave the bottom of the light extract column as a liquid. A portion of this liquid is routed through and vaporized in reboiler 22 to supply the vapors needed for fractionation. The surplus light extract is removed as a product stream. It is cooled by heat exchange with the desorbent stream in heat exchanger 11. This stream can be routed directly to other process units or further cooled in heat exchanger 17 and sent to tankage.

The light extract stream 21, depending on the type of feed preparation, contains one or all of the following compounds: all mono methyl paraffins, and aromatic compounds having molecular diameters of about 5.9 A. It also contains trace amounts of the normal paraffin compounds which are in the heavy extract stream.

Some refinery and chemical plants' product slates would make it desirable to remove a portion of the light extract as a separate stream. The methyl paraffins, and controlled amounts of the light aromatics can be removed in a concentrated form in a side stream from the light extract column.

The bottoms stream 24 consists mainly of the heavier aromatic fractions and small amounts of the heavier methyl paraffins. The concentration of ethylbenzene and paraxylene in the $A_8$ fraction is roughly equal.

The more tightly adsorbed normal paraffins are removed from the adsorbent with desorbent flowing countercurrent to the adsorbent beds. This stream is removed from the adsorption section and is charged to separate fractionation facilities. The admixture (50-75% vol. desorbent) is preheated in heat exchanger 15 and is charged to the heavy extract column.

In the light desorbent process the desorbent leave the heavy extract column as an overhead vapor stream. This vapor is condensed, and a portion of the liquid desorbent is returned to the heavy extract column as reflux. The surplus desorbent is heated in heat exchanger 12 by heat exchange with the heavy adsorbent stream and returned to the adsorption section of the process. Here this desorbent stream is mixed with desorbent streams from the raffinate column and light extract column, is preheated and charged to the adsorption bed for purifying and stripping the extract streams.

In the light adsorption process, the desorbent stream would normally be charged to the adsorption column slightly warmer than the feed stream. The desorbent would normally have a temperature of 0° F. to 100° F. higher than the feed temperature but can be 100° F. cooler to 300° F. warmer than the feed.

The heavy extract stream consists of several normal paraffin compounds ($n-C_6-n-C_{11}$). In some cases it may be desirable to split either or both of these streams into light and heavy normal paraffin streams by removing a side stream from the appropriate fractionation tower.

Although FIG. 3 has only light and heavy extract fractionation columns, a third extract column can be added to further increase the product slates of a refinery. A heavy isoparaffins concentrate (monomethyl $C_9$ through $C_{11}$) can be recovered by installing an additional extract column to process a third extract stream removed from the adsorption column between the light and heavy extract streams.

Polar compounds have been used to desorb strongly held normal paraffins from adsorbent. The inclusion of light polar compounds such as water, ammonia, carbon dioxide, hydrogen sulfide, and carbon disulfide in the desorbent assists the desorbent in stripping the tightly held normal paraffins from the adsorbent. These materials automatically go overhead with the desorbent in the raffinate and extract columns, thereby setting up their recycle path in the previously described process.

While this invention has been described fully and completely with special emphasis on certain preferred embodiments, it should be understood that within the scope of the appended claims this invention may be practiced otherwise than as specifically set forth herein.

I claim:

1. In an adsorption-desorption process for separating close boiling materials or isomers in which a raffinate having high octane components or precursors thereof is removed from the adsorption unit and recovered for use as a fuel or as a feedstock for reforming and a liquid desorbent is used to produce an extract of desired materials in said desorbent, the improvement which comprises:

supplying a liquid feedstock of a virgin naphtha or a natural gasoline comprising $C_5-C_{10}$ n-paraffins, naphthenes, aromatics, lightly branched $C_7-C_{10}$ paraffins and highly branched $C_6-C_{10}$ paraffins to an adsorption unit containing a solid refractory adsorbent, having a pore size of about 5-6 Å capable of accepting normal and lightly branched $C_6-C_{10}$ paraffins and rejecting highly branched paraffins, naphthenes and aromatics, to adsorb the normal and lightly branched $C_6-C_{10}$ paraffins and leave a raffinate of the unadsorbed components comprising naphthenes, aromatics and highly branched $C_6-C_{10}$ paraffins, circulating a desorbent liquid through said adsorption unit to remove a raffinate stream comprising interstitial unadsorbed components from said feedstock, comprising naphthenes, aromatics and highly branched $C_6-C_{10}$ paraffins, dissolved in said desorbent, circulating a further amount of said desorbent liquid through said adsorption unit to desorb components, comprising $C_6-C_{10}$ n-paraffins and lightly branched $C_6-C_{10}$ paraffins, therefrom as an extract stream comprising adsorbed components dissolved in said desorbent, circulating said extract stream to a first fractionating column to separate the same into a normal and lightly branched $C_6-C_{10}$ paraffin fraction for fuel use or further processing, and a liquid desorbent fraction, removing and recovering said fraction containing normal and lightly branched $C_6-C_{10}$ paraffins for use as a fuel or as a feedstock for further processing, circulating said raffinate stream to a second fractionating column to separate the same into a fraction containing unadsorbed components, comprising naphthenes, aromatics and highly branched $C_6-C_{10}$ paraffins, as a high octane fuel, and a liquid desorbent fraction, removing and recovering said fraction containing unadsorbed components, comprising naphthenes, aromatics and highly branched $C_6-C_{10}$ paraffins for use as a fuel or as a feedstock for reforming, and combining said desorbent fractions from said first and said second fractionating columns and recycling said combined fractions to said adsorption unit.

2. A process according to claim 1 in which said adsorbent is a silicalite having a pore size of about 5-6 Å capable of accepting normal and lightly branched $C_6-C_{10}$ paraffins and rejecting highly branched paraffins, naphthenes and aromatics.

3. A process according to claim 1 in which said adsorbent is S-115 silicalite, a silica polymorph consisting of crystalline silica, which after calcination in air at 600° C. for 1 hour, has a mean refractive index of 1.39 and a specific gravity at 25° C. OF 1.70 g./cc. having uniform pore dimensions of approximately 5.4 Angstrom units which does not exhibit ion-exchange properties.

4. A process according to claim 1 in which
said adsorbent is a silicalite having a pore size of about 5–6 A with a SiO$_2$ binder.

5. A process according to claim 1 in which
said adsorbent is a silicalite having a pore size of about 5–6 A with an Al$_2$O$_3$ binder.

6. A process according to claim 1 in which
said desorbent liquid comprises hydrocarbons differing by at least one carbon atom in chain length from the feed components.

7. A process according to claim 1 in which said desorbent liquid comprises n-pentane.

8. A process according to claim 1 in which said desorbent liquid comprises n-dodecane.

9. A process according to claim 1 in which
said close boiling materials comprise a mixture of di- and tri-methyl paraffins, isoparaffins, n-paraffins, naphthenes, and aromatics.

10. A process according to claim 1 in which
said close boiling materials consists essentially of a mixture of di- and tri-methyl paraffins 10% vol.; isoparaffins 25% vol.; n-paraffins 13% vol.; naphthenes 37% vol.; and aromatics 15% vol.

11. A process according to claim 1 in which
the feed is a debenzenized reformer feed.

12. A process according to claim 1 in which
said adsorption unit is a column containing 10–50 countercurrent beds of adsorbent and at a feed input of 100 volumes, the adsorbent retains 30 volumes and the raffinate stream consists of 70 volumes.

13. A process according to claim 1 in which
the saturated adsorbent bed is then contacted countercurrently with a small desorbent stream comprising n-paraffins having a chain length at least one carbon atom different from the adsorbed materials to purge all unadsorbed feed from the void space between the beds, and
the purified adsorbent beds are further contacted countercurrently with a larger desorbent stream to remove the adsorbed or extracted materials from the adsorbent as an extract stream.

14. A process according to claim 1 in which
said feed is supplied at an adsorbent to feed ratio of 8–15 lb. adsorbent per lb. feed, to adsorb the lower molecular weight isoparaffins and aromatic compounds with molecular diameters of about 5.9 A in addition to the more easily adsorbed compounds,
purging the saturated adsorbent with a small amount of a light desorbent to remove unadsorbed feed from the void areas of the adsorbent beds,
after the voids in the saturated adsorbent have been purged of undesirable compounds, partially stripping the beds countercurrently with a small amount of desorbent to remove only the lightly adsorbed compounds,
withdrawing the desorbent and lightly adsorbed materials, preheating the same in a heat exchange and charging to a light extract distillation column, and
recovering aromatics from the bottom of said light extract column.

15. A process according to claim 14 in which
said feed is supplied at an adsorbent to feed ratio of 8–15 lb. adsorbent per lb. feed, to adsorb the lower molecular weight isoparaffins and aromatic compounds with molecular diameters of about 5.9 A in addition to the more easily adsorbed compounds,
purging the saturated adsorbent with a small amount of a heavy desorbent to remove unadsorbed feed from the void areas of the adsorbent beds,
withdrawing the desorbent and adsorbed materials, preheating the same in a heat exchanger and charging to a heavy extract distillation column.

16. A process according to claim 1 in which
said adsorption unit contains a mixture of selected adsorbents specific for adsorption of n-paraffins and for lightly branched isoparaffins, and
purging said adsorption unit first with a desorbent for one adsorbent and then with an desorbent for the other adsorbent.

17. A process according to claim 1 in which
said feed is supplied to a first adsorption bed containing a silicalite adsorbent and then to a second adsorption bed containing a type 5A molecular sieve, to recover iso and normal paraffins in separate streams,
recovering a raffinate stream from the adsorption unit consisting of di-and tri- methyl paraffins, naphthenes, and aromatics with molecular diameters of larger than 5.9 A, and any desorbent used in purging the void in the adsorbent beds, and
fractionating adsorbed components, recovered by desorbent stripping, in a light extract column and a heavy extract column, and fractionating raffinate in a raffinate column, and
recovering and recycling desorbent from said columns.

* * * * *